United States Patent

Schwager et al.

[11] Patent Number: 5,476,905
[45] Date of Patent: Dec. 19, 1995

[54] GRAFTED, CROSSLINKED AND CROSSLINKABLE

[75] Inventors: Harald Schwager, Speyer; Thomas Muehlenbernd, Heidelberg; Bernd L. Marczinke, Speyer; Juergen Kerth, Carlsberg; Hans-Joachim Mueller, Gruenstadt, all of Germany

[73] Assignee: BASF Aktiengesellschaft, Ludwigshafen, Germany

[21] Appl. No.: 725,870

[22] Filed: Jul. 10, 1991

[30] Foreign Application Priority Data

Jul. 16, 1990 [DE] Germany ............... 40 22 570.4
Jul. 16, 1990 [DE] Germany ............... 40 22 569.0

[51] Int. Cl.$^6$ ............ C08F 255/02; C08F 265/02; C08F 265/04
[52] U.S. Cl. ............................ 525/301; 525/309
[58] Field of Search ............................ 525/301, 309

[56] References Cited

U.S. PATENT DOCUMENTS

| | | | |
|---|---|---|---|
| 3,328,339 | 6/1967 | Tierney. | |
| 3,862,266 | 1/1975 | McConnell et al. | 525/301 |
| 4,617,323 | 10/1986 | Kuwabara et al. | 521/60 |
| 4,727,120 | 2/1988 | Nogues | 525/168 |
| 4,751,270 | 6/1988 | Urawa et al. | 525/301 |
| 4,822,688 | 4/1989 | Nogues | 525/66 |
| 4,957,974 | 9/1990 | Ilenda et al. | 525/301 |
| 4,997,884 | 3/1991 | Ilenda et al. | 525/301 |
| 5,059,658 | 10/1991 | Sezume et al. | 525/301 |
| 5,109,066 | 4/1992 | Ilenda et al. | 525/309 |

FOREIGN PATENT DOCUMENTS 2455594  5/1976  Germany ............... 525/301

*Primary Examiner*—Paul R. Michl
*Assistant Examiner*—Olga Asinovsky
*Attorney, Agent, or Firm*—Keil & Weinkauf

[57] ABSTRACT

Propylene copolymers grafted with $\alpha,\beta$-ethylenically unsaturated carboxylic acids or derivatives and containing up to 35% by weight of other $C_2$- to $C_{10}$-alk-1-enes are obtainable by reacting the monomer to be grafted with a propylene copolymer at from 1 to 500 bar, where, in the absence of a free-radical initiator, from 0.01 to 1.0% by weight, based on the propylene copolymer, of the monomer to be grafted are admixed with the molten propylene copolymer, and the grafting reaction is carried out at from 210° to 350° C.

The propylene copolymers according to the invention can be converted into crosslinked or crosslinkable propylene copolymers by admixing organic crosslinking agents.

3 Claims, No Drawings

GRAFTED, CROSSLINKED AND CROSSLINKABLE

The present invention relates to propylene copolymers grafted with an α,β-ethylenically unsaturated carboxylic acid or derivative, containing up to 35% by weight of other $C_2$- to $C_{10}$-alk-1-enes and obtainable by reacting the monomer to be grafted with a propylene copolymer at from 1 to 500 bar, where, in the absence of a free-radical initiator, from 0.01 to 1.0% by weight, based on the propylene copolymer, of the monomer to be grafted is admixed with the molten propylene copolymer, and the graft reaction is carried out at from 210° to 350° C.

The present invention furthermore relates to a process for the preparation of these grafted propylene copolymers, to the crosslinked or crosslinkable propylene copolymers obtainable by admixing an organic crosslinking agent with these propylene copolymers, to a process for their preparation and to ionomers of these grafted propylene copolymers.

Graft copolymers can be prepared by first reacting the polymer to be grafted with a peroxide and subsequently bringing the product into contact with a suitable monomer (U.S. Pat. Nos. 3,862,265, 3,953,655 and 4,001,172). The treatment with the peroxide, which acts as an initiator, initially forms free radicals on the polymer chain, onto which monomers can add in the subsequent grafting reaction.

Furthermore, processes are known in which homopolymers or copolymers of ethylene are first grafted with unsaturated carboxylic acids and/or esters or anhydrides thereof by a reaction initiated by organic peroxides, and the products are subsequently reacted with multifunctional amines or alcohols (DE-A 26 27 785, EP-A 50 994, U.S. Pat. No. 4,089,794, 4,137,185, 4,161,452 and 4,382,128), generally giving crosslinked products which, although very stable, can no longer be processed thermally by methods which are customary in plastics technology due to their low melt flow index.

Furthermore, processes have been described for the preparation of grafted or crosslinked polypropylenes, but some of these have considerable disadvantages. Thus, for example, the use of peroxides in grafting and crosslinking reactions results in a reduction in molecular weight, which significantly impairs the mechanical properties of the resultant product [J. Appl. Poly. Sci., Vol. 32, 5431–5437 (1986)]. Another way of crosslinking polypropylenes is first to graft them with vinylsilanes and subsequently to crosslink the product by condensation with steam using an organotin catalyst (DE-A 3 520 106 and U.S. Pat. No. 3,328,339). However, this process is very complex since the tin catalysts, which are usually toxic, can only be removed from the product with difficulty. In addition, all the silane groups necessary for the adhesion of the polymer melt to polar substrates are hydrolyzed by water on cooling, with the consequence that multilayer composites are virtually impossible to produce. Furthermore, FR 25 72 417 discloses a process in which polypropylene can be grafted by reaction with an organic peroxide and an unsaturated carboxylic anhydride. The grafted polypropylene obtainable in this way can subsequently be reacted with a multifunctional amine to give a crosslinked material.

According to the prior art, grafting reactions in the case of polypropylene only result in products having good mechanical properties if the reaction is initiated by means of peroxides. However, the use of peroxides in grafting reactions is associated with a number of disadvantages. For example, if the monomer to be grafted is used in a relatively low concentration, a relatively high peroxide concentration is necessary to achieve virtually complete conversion. However, the use of a high peroxide concentration in the grafting of polypropylene generally results in a considerable reduction in molecular weight and in a reduction in adhesion to polar substances, eg. metals or polyamides, so that the resultant polymer does not have satisfactory applicational properties. Furthermore, polyolefins are frequently impaired in color and odor by using peroxides in grafting reactions. There are also considerable safety doubts about the use of peroxides in industry.

It is an object of the present invention to overcome the outlined disadvantages and to develop grafted polymers of propylene having improved applicational properties without using peroxides. These polymers can, if desired, be reacted further with organic crosslinking agents to give crosslinked or crosslinkable polymers.

We have found that this object is achieved by the propylene copolymers grafted with an ethylenically unsaturated carboxylic acid or derivative and defined at the outset.

In the process giving the polymers according to the invention, the graft monomers used are α,β-unsaturated carboxylic acids or derivatives, which, for the purposes of the present invention, are customary carboxylic acids which can be copolymerized with propylene, and esters, anhydrides or amide derivatives thereof. Preference is given, inter alia, to maleic acid, fumaric acid, itaconic acid, acrylic acid, crotonic acid or anhydrides thereof, maleic anhydride being particularly suitable.

The monomer to be grafted is reacted, in the process giving the polymers according to the invention, with a propylene copolymer containing up to 35% by weight of other $C_2$- to $C_{10}$-alk-1-enes.

For the purposes of the present invention, propylene copolymers are copolymers containing from 40 to 95% by weight of a propylene homopolymer and from 5 to 60% by weight of a random propylene copolymer containing copolymerized $C_2$- to $C_{10}$-alk-1-enes, eg. ethylene, but-1-ene, pent-1-ene, hex-1-ene, hept-1-ene or oct-1-ene, ethylene or but-1-ene being preferred. Particularly suitable here are propylene copolymers which, in addition to from 40 to 90% by weight of propylene homopolymer, also contain from 10 to 60% by weight of random propylene copolymer containing copolymerized $C_2$- to $C_{10}$-alk-1-enes, the comonomer proportion being not more than 35% by weight, preferably from 2 to 30% by weight, based on the total polymer.

For the purposes of the present invention, on the other hand, the propylene copolymers are random propylene copolymers containing up to 20% by weight of other $C_2$–$C_{10}$-alk-1-enes. Preferred propylene copolymers in this connection are those in which the comonomer content does not exceed 15% by weight. $C_2$–$C_{10}$-alk-1-enes particularly used for this purpose are ethylene, but-1-ene, pent-1-ene, hex-1-ene, hept-1-ene and oct-1-ene, it being possible to prepare these copolymers by copolymerizing the $C_2$–$C_{10}$-alk-1-enes either singly or as mixtures with the propylene. The copolymers particularly employed to prepare the polymers according to the invention are random propylene/ethyleneandrandompropylene/ethylene/but-1-ene copolymers with comonomer contents not exceeding 10% by weight.

These propylene copolymers are prepared by polymerization with the aid of Ziegler-Natta catalysts, which, in addition to a titanium-containing solid component, also contain a cocatalyst, for which purpose an aluminum compound is suitable. A further constituent of the cocatalyst, in addition to this aluminum compound, is preferably an electron-donor compound. The polymerization is carried out in the reactors usually used in industry for polymerization reactions, preferably in the gas phase.

The titanium-containing solid component is generally prepared using, as the titanium compound, a halide or alkoxide of trivalent or tetravalent titanium, preference being given to titanium chlorides, in particular titanium tetrachloride. The titanium-containing solid component advantageously contains a finely divided carrier, for which purpose silica, alumina and aluminum silicates of the empirical formula $SiO_2 \cdot aAl_2O_3$ where a is from 0.001 to 2, in particular from 0.01 to 0.5, have proven suitable.

The preferred carriers have a particle diameter of from 0.1 to 1,000 μm, in particular from 10 to 300 μm, a pore volume of from 0.1 to 10 cm³/g, in particular from 1.0 to 5.0 cm³/g, and a specific surface area of from 10 to 1,000 m²/g, in particular from 100 to 500 m²/g.

The preparation of the titanium-containing solid component is also carried out using, inter alia, compounds of magnesium, in particular magnesium halides, alkylmagnesium compounds and arylmagnesium compounds, and alkoxymagnesium and aryloxymagnesium compounds, preferably magnesium dichloride, magnesium dibromide and magnesium di($C_1$–$C_{10}$-alkyl) compounds. In addition, the titanium-containing solid component may also contain halogen, preferably chlorine or bromine.

Furthermore, the titanium-containing solid component also contains electron-donor compounds, for example monofunctional or polyfunctional carboxylic acids, carboxylic anhydrides and carboxylic esters, furthermore ketones, ethers, alcohols, lactones, and organophosphorus and organosilicon compounds. Preferred electron-donor compounds within the titanium-containing solid component are phthalic acid derivatives of the general formula I

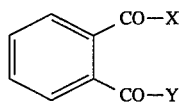   I where X and Y are each chlorine or $C_1$- to $C_{10}$-alkoxy or together are oxygen. Particularly preferred electron-donor compounds are phthalic esters, where X and Y are $C_1$–$C_6$-alkoxy, for example methoxy, ethoxy, propoxy or butoxy.

Other preferred electron-donor compounds within the titanium-containing solid component are, inter alia, diesters of 3- or 4-membered, substituted or unsubstituted cycloalkyl-1,2-dicarboxylic acids, and monoesters of substituted or unsubstituted benzophenone-2-carboxylic acids. The hydroxyl compounds used in these esters are alcohols which are customary in esterification reactions, inter alia $C_1$- to $C_{15}$-alkanols, $C_5$- to $C_7$-cycloalkanols which can themselves carry $C_1$- to $C_{10}$-alkyl groups, and furthermore $C_6$- to $C_{10}$-phenols.

The titanium-containing solid component can be prepared by conventional methods, for example as described, inter alia, in EP-A 45 975, EP-A 45 977, EP-A 86 473, EP-A 171 200, GB-A 2,111,066 and U.S. Pat. No. 4,857,613.

The titanium-containing solid component is preferably prepared by the three-step process described below.

In the first step, a solution of the magnesium-containing compound in a liquid alkane is first added to a finely divided carrier, preferably silica or $SiO_2 \cdot aAl_2O_3$, where a is from 0.001 to 2, in particular from 0.01 to 0.5, and this mixture is then stirred for from 0.5 to 5 hours at from 10° to 120° C. From 0.1 to 1 mol of the magnesium compound is preferably employed per mole of the carrier. A halogen or a hydrogen halide, in particular chlorine or hydrogen chloride, in a two-fold, preferably five-fold, molar excess or more, based on the magnesium-containing compound, is then added with constant stirring. After from about 30 to 120 minutes, the solid is separated from the liquid phase.

In the second step, the product obtained in this way is introduced into a liquid alkane, and a $C_1$- to $C_8$-alkanol, in particular ethanol, a halide or an alkoxide of trivalent or tetravalent titanium, in particular titanium tetrachloride, and an electron-donor compound are then added. From 1 to 5 mol, in particular from 2 to 4 mol, of alkanol, from 2 to 20 mol, in particular from 4 to 10 mol, of trivalent or tetravalent titanium and from 0.01 to 1 mol, in particular from 0.1 to 1.0 mol, of the electron-donor compound are employed per mole of magnesium in the solid obtained from the first step. This mixture is stirred for one hour or more at from 10° to 150° C., and the resultant solid is subsequently filtered off and washed with a liquid alkane, preferably hexane or heptane.

In the third step, the solid obtained from the second step is extracted for a few hours at from 100° to 150° C. with excess titanium tetrachloride or an excess of a solution of titanium tetrachloride in an inert solvent, preferably an alkylbenzene, the solvent containing 5% by weight or more of titanium tetrachloride. The product is then washed with a liquid alkane until the content of titanium tetrachloride in the washings is less than 2% by weight.

The titanium-containing solid component obtainable in this way is used with a cocatalyst as the Ziegler-Natta catalyst system. Suitable cocatalysts here are aluminum compounds and other electron-donor compounds.

Aluminum compounds which are suitable as cocatalysts are trialkylaluminum and compounds in which an alkyl has been replaced by alkoxy or halogen, for example by chlorine or bromine. Preference is given to trialkylaluminum compounds whose alkyl groups each have from 1 to 8 carbon atoms, for example trimethylaluminum, triethylaluminum or methyldiethylaluminum.

In addition to the aluminum compound, preference is given as a further cocatalyst to electron-donor compounds, such as monofunctional or polyfunctional carboxylic acids, carboxylic anhydrides and carboxylic esters, furthermore ketones, ethers, alcohols, lactones and organophosphorus and organosilicon compounds. Preferred electron-donor compounds here are organosilicon compounds of the general formula II $$R_n^1 Si(OR^2)_{4-n}$$   II where $R^1$ is identical or different $C_1$- to $C_{20}$-alkyl, 5- to 7-membered cycloalkyl, which may itself carry $C_1$- to $C_{10}$alkyl, or $C_6$- to $C_{20}$-aryl or -arylalkyl, $R^2$ is identical or different $C_1$- to $C_{20}$-alkyl, and n is 1, 2 or 3. Particular preference is given to compounds in which $R^1$ is $C_1$- to $C_8$-alkyl or 5- to 7-membered cycloalkyl, $R^2$ is $C_1$- to $C_4$-alkyl, and n is 1 or 2.

Of these compounds, dimethoxydiisopropylsilane, dimethoxyisobutylisopropylsilane, dimethoxydiisobutylsilane, dimethoxydicyclopentylsilane and diethoxyisobutylisopropylsilane should be particularly emphasized.

Preference is given to catalyst systems in which the atomic ratio between aluminum from the aluminum compound and titanium from the titanium-containing solid component is from 10:1 to 800:1, in particular from 20:1 to 200:1, and the molar ratio between the aluminum compound and the electron-donor compound employed as cocatalyst is from 1:1 to 100:1, in particular from 2:1 to 80:1. The catalyst constituents may be introduced into the polymerization system individually in any desired sequence or as a mixture of two components.

The propylene copolymers required for the preparation of the grafted polymers according to the invention can be prepared in a two-step process in which, in the first step, propylene is polymerized and, in the second step, a mixture of propylene and one or more $C_2$–$C_{10}$-alk-1-enes is subsequently polymerized to this polymer.

The polymerization of the propylene in the first step is carried out at from 20 to 40 bar, at from 60° to 90° C. and at a mean residence time of the reaction mixture of from 1 to 5 hours, preferably at from 20 to 35 bar, from 65° to 85° C. and at a mean residence time of from 1.5 to 4 hours. The reaction conditions are usually selected in such a manner that from 0.05 to 2 kg, preferably from 0.1 to 1.5 kg, of polypropylene are formed per mmol of the aluminum component in the first polymerization step.

After the reaction is complete, this polypropylene is discharged from the first polymerization step together with the catalyst and transferred into the second polymerization step, where a mixture of propylene and one or more $C_2$–$C_{10}$-alk-1-enes, in particular ethylene or but-1-ene, is polymerized on. The pressure prevailing in the second polymerization step is 7 bar, preferably 10 bar, below that in the first polymerization step and is from 5 to 30 bar, preferably from 10 to 25 bar. The temperature is 30° to 100°, preferably 35° to 80° C. and the mean residence time of the polymer is from 1 to 5 hours, preferably from 1.5 to 4 hours.

In the second polymerization step, the ratio between the partial pressures of propylene and the $C_2$–$C_{10}$-alk-1-ene(s) is usually in the range from 0.5:1 to 5:1, in particular in the range from 1:1 to 4:1. The weight ratio between the monomers reacted in the first and the second polymerization steps is preferably in the range from 1:1 to 20:1, in particular from 2:1 to 15:1.

It is also possible to introduce a $C_1$- to $C_8$-alkanol, in particular a $C_1$–$C_4$-alkanol, which affects the activity of the Ziegler-Natta catalyst into the reaction mixture in the second polymerization step. Particularly suitable alkanols for this purpose are, inter alia, methanol, ethanol, n-propanol, n-butanol and, in particular, isopropanol. The amount of added $C_1$–$C_8$-alkanol should in this case expediently be such that the molar ratio between the aluminum compound and the $C_1$–$C_8$-alkanol is from 0.1:1 to 10:1, in particular from 0.2:1 to 5:1. It is also advisable to adjust the reaction parameters so that the weight ratio between the monomers reacted in the first and second polymerization steps is from 1:1 to 20:1, in particular from 1.5:1 to 15:1.

Furthermore, the propylene copolymers required for the preparation of the grafted polymers according to the invention can be prepared by random copolymerization. The copolymerization of the propylene and the $C_2$–$C_{10}$-alk-1-enes employed as comonomers is preferably carried out in a reactor in the absence of a liquid medium under a pressure of from 20 to 40 bar, at from 60° to 90° C. and with an average residence time of the polymer of from 1 to 5 hours. A preferred process is one in which the ratio of the partial pressures of propylene and of the $C_2$–$C_{10}$-alk-1-enes is set at from 5:1 to 100:1. The reactors which can be used are those conventional in polymerization technology.

The grafted propylene copolymers according to the invention are prepared by a process in which from 0.01 to 1.0% by weight, based on the propylene copolymer, of the monomer to be grafted is admixed with the molten propylene copolymer at from 1 to 500 bar, preferably from 1 to 300 bar, in the absence of a free-radical initiator, and the grafting reaction is carried out at from 210° to 350° C. The monomer to be grafted is preferably employed in a concentration of from 0.01 to 0.5% by weight, in particular from 0.01 to 0.4% by weight, in each case based on the propylene copolymer. The grafting reaction is advantageously carried out at from 210° to 290° C., in particular at from 210° to 260° C., and at a residence time of from 0.5 to 10 minutes, in particular from 0.5 to 5 minutes.

The peroxide-free grafting of the propylene copolymers can be carried out in reactors which are customary in plastics technology, for example extruders or Brabender mixers. Twin-screw extruders are particularly suitable. In a preferred embodiment, the propylene copolymer is metered, together with the monomer to be grafted, in the absence of an organic peroxide, into the feed opening of a twin-screw extruder, where the mixture is first melted at from 170° to 180° C. and subsequently grafted at from 210° to 350° C. for from 0.5 to 5 minutes. The monomer to be grafted is preferably added in the liquid state after prior warming. The monomer to be grafted may alternatively be introduced into the extruder after the propylene copolymer has been melted. Traces of the unreacted monomer to be grafted are expediently removed, after completion of the grafting reaction, in two degassing zones downstream of the feed zone of the extruder.

The grafted propylene copolymers obtainable in this way usually contain from 0.01 to 1.0% by weight of the monomer to be grafted. They have good applicational properties, in particular high adhesion to polar substances, for example to metals or polyamides. Their flow properties are virtually unchanged compared with the ungrafted propylene copolymer, since virtually no reduction in molecular weight takes place during the grafting reaction as a consequence of the peroxide-free process. They are colorless and odorless and contain only low levels of residual monomer. Their melt flow indices are in the range from 1 to 100 g/10 min, preferably from 2 to 50 g/10 min, in each case measured in accordance with DIN 53 735 at 230° C. and 2.16 kg. The melt flow index corresponds to the amount of polymer forced out of a test apparatus standardized in accordance with DIN 53 735 within 10° minutes at 230° C. under a weight of 2.16 kg.

The propylene copolymers according to the invention are suitable, inter alia, for extrusion of hollow articles and in injection molding. Their property profile also makes them particularly suitable for use as adhesion promoters, as coating films and as basic units in the preparation of ionomers. In the latter case, the carboxyl groups, either in free form or accessible by hydrolysis, of the grafted propylene copolymer according to the invention are reacted with inorganic bases or salts to give the corresponding ionized polymers, known as ionomers. Alkali metal compounds and salts of alkali metals, alkaline earth metals or compounds of zinc with organic acids are particularly suitable here (U.S. Pat. Nos. 3,264,272 and 3,437,718).

Ionomers prepared from salts of polyvalent metals, such as magnesium, calcium or zinc, generally have lower xylene-soluble contents than the corresponding ionomers prepared from salts of monovalent metals, such as sodium or potassium.

Due to their good applicational properties, the peroxide-free propylene copolymers according to the invention can, in particular, also be processed with organic crosslinking agents to give novel crosslinked polymers. In this case, the grafted propylene copolymers are reacted with organic crosslinking agents at from 1 to 500 bar and from 210° to 350° C., preferably from 1 to 300 bar and 210° to 280° C., in particular from 210° to 260° C. Suitable organic crosslinking agents are the substances which are usual in crosslinking reactions, in particular primary or secondary polyamines, amino alcohols, alcohols or epoxide-containing compounds. Preference is given to compounds which contain at least two carbon atoms, for example ethylenediamine, diethylenetriamine, triethylenetetramine, diethanolamine, triethanolamine, dipropanolamine, tripropanolamine, ethyleneaminoethylamine, dimethylethylenediamine, diethylaminopropylamine, dimethylneopentanediamine, 1,8-octanediamine, 4,7-dioxadecane-1,10-diamine, polytetrahydrofuran-α,ω-diamine, dimethyldipropylenetriamine, neopentanediamine, dimethylaminobutanol, dodecylamine, hexamethylenediamine, diethanoiamine, N,N-diethylaminopropylamine, 1,4-bis[2,3-epoxypropoxy] benzene, bis[2,3-epoxypropyl] ether or 1,2:5,6-bisepoxyhexane.

The organic crosslinking agents are usually added to the propylene copolymer in amounts of from 0.5 to 500 mol-%, preferably from 1 to 300 mol-%, based on the content of the grafted comonomer.

It is furthermore possible to carry out the grafting and crosslinking in a single processing step and in a single mixer, which is considerably less complex from a process-technological point of view.

The crosslinking reaction may be carried out in the reactors which are usual in plastics technology, for example in extruders or Brabender mixers, twin-screw extruders being particularly suitable. In a preferred embodiment, the organic crosslinking agent is added to the molten grafted propylene copolymer in the reaction zone downstream of the feed zone of the reactor. The organic crosslinking agent may be introduced into the reactor either cold, in the molten state or as a solution in an inert solvent. The residence times of the reactants in the crosslinking reaction are from 0.2 to 10 minutes, preferably from 0.3 to 5 minutes. Traces of unreacted organic crosslinking agents and solvents are expediently removed, after completion of the grafting reaction, in two degassing zones downstream of the reaction zone of the reactor.

Surprisingly, it has been found that the crosslinked propylene copolymers obtainable in this way have good processing properties at elevated temperature. Parts of the propylene copolymer according to the invention generally remain uncrosslinked, and thus still have adequate processing properties. The melt flow indices of the crosslinked propylene copolymers are less than 10 g/10 min, preferably less than 5 g/10 min, in each case measured in accordance with DIN 53 735 at 230° C. and 2.16 kg. The crosslinked propylene copolymers according to the invention have high mechanical stability.

The grafted propylene copolymers according to the invention can also be reacted with organic crosslinking agents in such a manner that crosslinkable propylene copolymers are produced which have good processing properties in the pre-crosslinked state and can be crosslinked in a simple manner.

These crosslinkable propylene copolymers, which are likewise according to the invention, are prepared by admixing the organic crosslinking agents described above under the crosslinking reaction with the grafted propylene copolymers at from 1 to 500 bar at less than 210° C. and at residence times of the mixture of less than 30 seconds, and subsequently rapidly cooling the mixture. The admixing of the organic crosslinking agent is preferably carried out at from 1 to 300 bar and not more than 200° C. and at a residence time of not more than 25 seconds. This gives an as yet uncrosslinked, but crosslinkable mixture from the grafted propylene copolymer and the organic crosslinking agent.

The process giving the crosslinkable propylene copolymers according to the invention can be carried out in the same reactors and, with the exception of the temperature and residence time, under the same process conditions as the crosslinking reaction described above, so that reference is made to the above description with respect to the details. It need only be added that the cooling of the crosslinkable mixture is usually carried out in the degassing zones of the reactors used. The crosslinkable mixture is first cooled to less than 100° C., preferably less than 80° C., and subsequently granulated.

The crosslinkable propylene copolymer according to-the invention is peroxide-free and, although thermally crosslinkable, is storable and processable for months. Its melt flow index is in the range from 5 to 50 g/10 min, preferably from 5 to 40 g/10 min (at 230° C. and 2.16 kg, in accordance with DIN 53 735). By simple heating, it can subsequently be converted, with amide or ester formation, into a crosslinked product having a melt flow index of less than 5 g/10 min (230° C. and 2.16 kg, in accordance with DIN 53 735) and having high mechanical strength and good adhesion to polar substances.

EXAMPLES

Examples 1–4a and Comparative Example A were carried out in a Werner & Pfleiderer ZSK 40 twin-screw extruder. The propylene copolymers used were fed into the twin-screw extruder as a coarse powder or as granules, and were melted at 180° C. The polymer throughput in the extruder was 20 kg/h, at 150 revolutions per minute.

EXAMPLE 1

100 parts by weight of a propylene-ethylene copolymer containing 77% by weight of propylene homopolymer, 23% by weight of propylene-ethylene copolymer [determined by extraction fractionation by the method of W. Holtrup, Makromol. Chem. 178 (1977), 2335], an ethylene content of 18% by weight [determined by Fourier-transformation infrared spectroscopy] and having a melt flow index of 4.0 g/10 min [at 230° C. and 2.16 kg, in accordance with DIN 53 735] were melted at 180° C. in a ZSK 40 twin-screw extruder, 0.16 part by weight of liquid maleic anhydride was added, and the reaction was initiated at 260° C. The pressure was 5 bar, and the mean residence time of the components was 2 minutes. When the grafting reaction was complete, unreacted maleic anhydride was removed from the polymer melt via downstream degassing zones, and the product was subsequently cooled in a waterbath and then granulated and dried.

The grafted propylene copolymer obtained is colorless and odorless. The content of grafted maleic anhydride, the grafting yield (content of grafted maleic anhydride, based on the total amount of maleic anhydride employed), the melt flow index, the impact resistance and the adhesion to polyamide are given in Table 1 below.

COMPARATIVE EXAMPLE A 100 parts by weight of the propylene copolymer used in Example 1 were grafted under the conditions of Example 1 with 0.16 part by weight of maleic anhydride, but, by contrast, 0.01 part by weight of dicumyl peroxide was additionally metered into the extruder.

The product obtained is yellow and has a strong smell of the decomposition products of the peroxide. As a consequence of the reduction in molecular weight, it has a higher melt flow index than the original propylene copolymer, and the adhesion to polyamide is reduced.

The precise results are given in Table 1 below, together with the content of maleic anhydride and the grafting yield.

EXAMPLE 2

100 parts by weight of a propylene-ethylene copolymer containing 80% by weight of propylene homopolymer, 20% by weight of propylene-ethylene copolymer [determined by extraction fractionation by the method of W. Holtrup, Makromol. Chem. 178 (1977), 2335], an ethylene content of 5% by weight [determined by Fourier-transformation infra-red spectroscopy] and a melt flow index of 3.6 g/10 min [at 230° C. and 2.16 kg, in accordance with DIN 53 735] were treated, under the conditions of Example 1, with 0.08 part by weight of liquid maleic anhydride, and the reaction was initiated at 260° C.

The grafted propylene copolymer obtained is colorless and odorless. The content of grafted maleic anhydride, the grafting yield, the melt flow index, the impact resistance and the adhesion to polyamide are given in Table 1 below.

EXAMPLE 3

100 parts by weight of a propylene-ethylene copolymer, comprising 47% by weight of propylene homopolymer and 53% by weight of propylene-ethylene copolymer, and having an ethylene content of 30% by weight and a melt flow index of 2.0 g/10 min [at 230° C. and 2.16 kg, in accordance with DIN 53 735] were treated, under the conditions of Example 1, with 0.15 part by weight of liquid maleic anhydride, and the reaction was initiated at 260° C.

The grafted propylene copolymer obtained is colorless and odorless. The content of grafted maleic anhydride, the grafting yield, the melt flow index, the impact resistance and the adhesion to polyamide are given in Table 1 below.

EXAMPLE 4a 100 parts by weight of a propylene-ethylene copolymer, comprising 80% by weight of propylene homopolymer and 20% by weight of propylene-ethylene copolymer, and having an ethylene content of 12% by weight and a melt flow index of 2.8 g/10 min [at 230° C. and 2.16 kg, in accordance with DIN 53 735] were treated, under the conditions of Example 1, with 0.065 part by weight of liquid maleic anhydride, and the reaction was initiated at 260° C.

The grafted propylene copolymer obtained is colorless and odorless. The content of grafted maleic anhydride, the grafting yield, the melt flow index, the impact resistance and the adhesion to polyamide are given in Table 1 below.

EXAMPLE 4b 100 parts by weight of the propylene copolymer grafted in Example 4a were subsequently fed to a Werner & Pfleiderer ZSK 57 twin-screw extruder, where they were melted in a melting zone at 180° C. 200 mol-%, based on the content of grafted comonomer, of 1,6-hexanediamine, in the form of a 50% strength by weight solution in water, were added to the polymer melt at 2 bar in a downstream zone. The 1,6-hexanediamine used as crosslinking agent was incorporated homogeneously, and reacted with the propylene copolymer in a downstream reaction zone at 3 bar, 220° C. and a residence time of the reaction mixture of 1 minute. When the crosslinking was complete, the unreacted crosslinking agent was removed from the polymer melt together with the water via downstream degassing zones, and the product was subsequently cooled in a waterbath and then granulated and dried.

The crosslinked propylene copolymer obtained is colorless and odorless and has a lower melt flow index and a higher impact resistance than the grafted, uncrosslinked products. The precise results are given in Table 2 below.

COMPARATIVE EXAMPLE B 100 parts by weight of the propylene-ethylene copolymer used in Example 4a were grafted, under the conditions of Example 4a, with 0.08% by weight of maleic anhydride, but, by contrast, 0.01 part by weight of dicumyl peroxide was additionally metered into the extruder.

The product obtained is yellow and smells strongly of the decomposition products of the peroxide. Its melt flow index is 8.1 g/10 min [at 230° C. and 2.16 kg, in accordance with DIN 53 735], and its content of grafted maleic anhydride is 0.06% by weight.

100 parts by weight of this grafted propylene copolymer were subsequently reacted, under the conditions of Example 4b, with 200 mol-%, based on the content of grafted comonomer, of 1,6-hexanediamine in the form of a 50% strength by weight solution in water.

Considerable processing problems were encountered since it was no longer possible to control the crosslinking reaction in this case. The product crosslinked in this way had such a low melt flow index (0.2 g, at 190° C. and 21.6 kg, in accordance with DIN 53 735), that it was no-longer extrudable. The experiment therefore had to be terminated.

EXAMPLE 5

100 parts by weight of the propylene copolymer grafted in Example 4a were crosslinked, under the conditions of Example 4b, with 200 mol-%, based on the content of grafted comonomer, of diethanolamine, used in the form of a 50% strength by weight solution in water.

The crosslinked propylene copolymer obtained is colorless and odorless and has a lower melt flow index and a higher impact resistance than the grafted, uncrosslinked products. The precise results are given in Table 2 below.

EXAMPLE 6

100 parts by weight of the propylene copolymer grafted in Example 4a were crosslinked, under the conditions of Example 4b, with 100 mol-%, based on the content of grafted comonomer, of 1,6-hexanediamine, used in the form of a 50% strength by weight solution in water.

The crosslinked propylene copolymer obtained is colorless and odorless and has a lower melt flow index and a higher impact resistance than the grafted, uncrosslinked products. The precise results are given in Table 2 below.

EXAMPLE 7

100 parts by weight of the propylene copolymer grafted in Example 4a were crosslinked, under the conditions of Example 4b, with 50 mol-%, based on the content of grafted comonomer, of 1,6-hexanediamine, used in the form of a 50% strength by weight solution in water.

The crosslinked propylene copolymer obtained is colorless and odorless and has a lower melt flow index and a higher impact resistance than the grafted, uncrosslinked products. The precise results are given in Table 2 below.

EXAMPLE 8

In this experiment, the grafting an crosslinking of the propylene copolymer were carried out in one extruder and in one processing step.

100 parts by weight of a propylene-ethylene copolymer containing 80% by weight of propylene homopolymer and 20% by weight of propylene-ethylene copolymer, and having an ethylene content of 12% by weight and a melt flow index of 2.8 g/10 min [at 230° C. and 2.16 kg, in accordance with DIN 53 735] were introduced into the feed opening of a Werner & Pfleiderer ZSK 57 twin-screw extruder, melted at 180° C. and subsequently treated with 0.16 part by weight of liquid maleic anhydride. The actual grafting reaction was carried out in the downstream reaction zone at 260° C. and 2 bar and at a residence time of 0.8 minute. The product melt was freed from volatile constituents, in particular from unreacted comonomer, in a downstream degassing zone. The grafted propylene copolymer was then transferred into a further reaction zone, where it was crosslinked at 220° C. and 4 bar and at a residence time of 0.3 minute, with 200 mol-%, based on the content of grafted comonomer, of 1,6-hexamethylenediamine, used in the form of a 50% strength by weight solution in water. The unreacted crosslinking agent was subsequently removed, together with other volatile constituents, in a further degassing zone, and the product was subsequently cooled in a waterbath and then granulated and dried.

The crosslinked propylene copolymer obtained is colorless and odorless and has a lower melt flow index than the propylene copolymer used at the beginning of the experiment. The precise results are given in Table 2 below.

EXAMPLE 9

In this experiment, a crosslinkable propylene copolymer was prepared.

First, a grafted propylene copolymer was prepared under the conditions of Example 8, and was subsequently mixed with 1,6-hexamethylenediamine, the mixing, by contrast, taking place at 200° C. and at a residence time of 25 seconds. The product was subsequently discharged directly, cooled in a waterbath and then granulated and dried.

The polymer obtained is crosslinkable, but still has good processing properties and has a melt flow index of 6.9 g/10 min [at 230° C. and at 2.16 kg, in accordance with DIN 53 735]. It can be stored for months as granules in polyethylene sacks.

After 10 months, a crosslinked product was produced from this crosslinkable polymer in a Werner & Pfleiderer processing extruder at 260° C. and 5 bar and at a residence time of 2 minutes.

The crosslinked propylene copolymer obtained in this way is colorless and odorless and has a lower melt flow index than the crosslinkable starting material. The precise results are given in Table 2 below.

TABLE 1

|  | Examples | | | | Comparative Example |
|---|---|---|---|---|---|
|  | 1 | 2 | 3 | 4a | A |
| Content of grafted comonomer [parts by weight per 100 parts by weight of propylene block copolymer] | 0.13 | 0.06 | 0.14 | 0.05 | 0.11 |
| Grafting yield [%] | 81 | 75 | 93 | 77 | 69 |
| Melt flow index* [230° C./2.16 kg] | 4.9 | 9.6 | 11.3 | 5.5 | 8.1 |
| Notched impact strength** [kJ/m$^2$] | 7.3 | 3.0 | no fracture | 6.2 | <3.0 |
| Adhesion to polyamide [N/15 mm]*** | 15 | 7 | 14 | 7 | 6 |

*in accordance with DIN 53 735
**in accordance with DIN 53 453 at −20° C.
***in accordance with EP-A 157 107, pages 4–5

TABLE 2

|  | Examples | | | | | | Comparative Example |
|---|---|---|---|---|---|---|---|
|  | 4b | 5 | 6 | 7 | 8 | 9 | B |
| Content of grafted comonomer [parts by weight per 100 parts by weight of propylene block copolymer] | 0.05 | — | — | — | 0.12 | — | 0.06 |
| Melt flow index* [230° C./2.16 kg] | 2.5 | 2.1 | 3.5 | 4.6 | 2.5 | 2.7 | 0.2$^a$ [190° C./21.6 kg] |
| Notched impact strength** [kJ/m$^2$] | 9.2 | 9.0 | 8.8 | 8.5 | 8.3 | 8.2 | — |

*in accordance with DIN 53 735
**in accordance with DIN 53 453 at −20° C.?
$^a$in accordance with DIN 53 735

Examples 10–12 and Comparative Example C were carried out in a twin-screw extruder supplied by Werner & Pfleiderer (ZSK 40). The random propylene copolymers used for this were introduced into the extruder as a coarse powder or as granules and melted at 180° C. The extruder operated at 150 revolutions per minute with 20 kg of polymer passing through per hour.

EXAMPLE 10

100 parts by weight of a propylene-ethylene copolymer containing 2.1% by weight of ethylene (determined by Fourier transformation infra-red spectroscopy) and with a melt flow index of 1.8 g/10 min (DIN 53 735 method with 2.16 kg at 230° C.) and a melting point of 149° C. were melted in a ZSK 40 twin-screw extruder at 180° C., 0.12 part by weight of liquid maleic anhydride was added and the mixture was reacted at 260° C. under 4 bar with an average residence time of 2 minutes. After the grafting reaction was complete, unreacted maleic anhydride was removed from the polymer melt in the downstream degassing zones, and the product was subsequently cooled in a waterbath and then granulated and dried.

The resulting grafted random propylene copolymer is odorless and colorless. The content of grafted maleic anhydride, the grafting yield (content of grafted maleic anhydride based on the total amount of maleic anhydride used), the melt flow index, the xylene solubles and the adhesion to polyamide are shown in Table 3 which follows.

COMPARATIVE EXAMPLE C

Using the conditions of Example 10, 100 parts by weight of the random propylene-ethylene copolymer used therein were grafted with 0.12 part by weight of maleic anhydride, with the difference that 0.01 part by weight of dicumyl peroxide was also metered into the extruder.

The resulting product has a yellow color and a strong odor of the peroxide decomposition products. As a consequence of the reduction in molecular weight it has a higher melt flow index than the original propylene-ethylene copolymer, the adhesion to polyamide is reduced, and the xylene solubles are increased. The exact results are to be found together with the maleic anhydride content and the grafting yield in Table 3 which follows.

EXAMPLE 11

Using the conditions of Example 10, 100 parts by weight of a random propylene-ethylene copolymer containing 7.2% by weight of ethylene (determined by Fourier transformation infra-red spectroscopy), and with a melt flow index of 6.0 g/10 min (DIN 53 735 method with 2.16 kg at 230° C.) and a melting point of 124° C. were mixed with 0.23 part by weight of liquid maleic anhydride and reacted at 260° C.

The resulting grafted propylene-ethylene copolymer is colorless and odorless. The content of grafted maleic anhydride, the grafting yield, the melt flow index, the xylene solubles and the adhesion to polyamide are to be found in Table 3 which follows.

EXAMPLE 12

Using the conditions of Example 10, 100 parts by weight of a random propylene-ethylene-1-butene copolymer containing 3.9% by weight of ethylene and 2.0% by weight of 1-butene and with a melt flow index of 7.0 g/10 min (DIN 53 735 method with 2.16 kg at 230° C.) and a melting point of 130° C. were mixed with 0.18 part by weight of maleic anhydride and reacted at 260° C.

The resulting grafted propylene-ethylene-1-butene copolymer is colorless and odorless. The content of grafted maleic anhydride, the grafting yield, the melt flow index, the xylene solubles and the adhesion to polyamide are to be found in Table 3 which follows.

EXAMPLE 13

100 parts by weight of the propylene-ethylene copolymer grafted in Example 11 were then introduced into a twin-screw extruder supplied by Werner & Pfleiderer (ZSK 57) and then melted at 180° C. in the melting zone. In a downstream zone, 200 mol %, based on the grafted comonomer content, of 1,6-hexanediamine in the form of a 50% by weight solution in water were added to the polymer melt under a pressure of 2 bar. The 1,6-hexanediamine crosslinking agent was mixed in homogeneously and reacted with the propylene-ethylene copolymer in a downstream zone under a pressure of 5 bar, at 220° C. and with an average residence time of 2 minutes. After the crosslinking was complete, the unreacted crosslinking agent was removed together with the water from the polymer melt in downstream degassing zones, and the product was then cooled in a waterbath and subsequently granulated and dried.

The resulting crosslinked propylene-ethylene copolymer is colorless and odorless and has a lower melt flow index and reduced xylene solubles compared with the grafted uncrosslinked products. The exact results are to be found in Table 3 which follows.

COMPARATIVE EXAMPLE D

Using the conditions of Example 11, 100 parts by weight of the propylene-ethylene copolymer used therein were mixed with 0.27 part by weight of liquid maleic anhydride and reacted at 260° C., with the difference that the grafting was carried out in the presence of 0.01 part by weight of dicumyl peroxide.

The resulting product has a yellow color and a strong odor of the peroxide decomposition products. Its melt flow index is 14.8 g/min (DIN 53 735 method with 2.16 kg at 230° C.) and it contains 0.24% by weight of maleic anhydride grafted on. Then, using the conditions of Example 13, 100 parts by weight of this grafted propylene-ethylene copolymer were reacted with 200 mol-%, based on the grafted comonomer content, of 1,6-hexanediamine in the form of a 50% strength by weight solution in water.

This resulted in considerable processing difficulties because it was no longer possible to control the crosslinking reaction. The product crosslinked in this way had such a small melt flow index (1.0 g/10 min by the DIN 53 735 method with 21.6 kg at 190° C.) that extrusion was no longer possible. It was therefore necessary to discontinue the experiment.

EXAMPLE 14

A crosslinkable propylene-ethylene copolymer was prepared in this experiment.

The propylene-ethylene copolymer prepared in Example 11 was mixed as in Example 13 with 200 mol-%, based on the grafted comonomer content, of 1,6-hexanediamine, with the difference that the crosslinking agent was added at 198° C. and the average residence time was 20 seconds. The product was then discharged directly, cooled in a waterbath and then granulated and dried.

The resulting polymer is crosslinkable but still easily processed and has a melt flow index of 7.1 g/10 min (DIN 53 735 method with 2.16 kg at 230° C.). It can be stored as granules in polyethylene sacks for months.

After 10 months, this crosslinkable polymer was converted into a crosslinked product in an extruder supplied by Werner & Pfleiderer at 260° C. and under a pressure of 4 bar with a residence time of 2 minutes.

The crosslinked propylene-ethylene copolymer obtained in this way is colorless and odorless and has a lower melt flow index than the crosslinkable starting material. The exact results are to be found in Table 3 which follows.

In Examples 15 to 17, sodium or zinc ionomers of grafted propylene-ethylene copolymers were prepared.

EXAMPLES 15, 15a and 15b 100 parts by weight of a propylene-ethylene copolymer containing 80% by weight of propylene homopolymer and 20% by weight of propylene-ethylene copolymer [determined by extraction fractionation by the method of W. Holtrup, Makromol. Chem. 178 (1977) 2335], and having an ethylene content of 8.2% by weight [determined by Fourier transformation infra-red spectroscopy] and a melt flow index of 2 g/10 min [at 230° C. and 2.16 kg, in accordance with DIN 53 735] were treated under the conditions of Example 1 with 0.12 part by weight of liquid maleic anhydride and reacted at 260° C. The resultant product is colorless and odorless. The melt flow index, the impact strength and xylene-soluble contents are given in Table 4 which follows.

100 parts by weight of this grafted propylene copolymer were subsequently melted in a Werner & Pfleiderer ZSK 40 twin-screw extruder in a melting zone at 180° C. 0.2 part by weight of sodium acetate or 0.27 part by weight of zinc acetate was added to the polymer melt in a downstream zone and the mixture was reacted in a downstream reaction zone at 240° C. and a residence time of the respective mixture of 2 minutes. The product was cooled in a waterbath, granulated and dried.

The resultant sodium or zinc ionomers are colorless and odorless. As shown in Table 4 below, the ionomers have a lower melt flow index than the grafted propylene copolymer, and, in particular, the zinc ionomer has a greatly reduced xylene-soluble content.

EXAMPLE 16

100 parts by weight of a propylene-ethylene copolymer containing 50% by weight of propylene homopolymer and 50% by weight of propylene-ethylene copolymer [determined by extraction fractionation by the method of W. Holtrup, Makromol. Chem. 178 (1977) 2335] and having an ethylene content of 26% by weight [determined by Fourier transformation infra-red spectroscopy] and a melt flow index of 1 g/10 min [at 230° C. and 2.16 kg, in accordance with DIN 53 735] were treated under the conditions of Example 1 with 0.17 part by weight of liquid maleic anhydride and reacted at 260° C. The resultant product is colorless and odorless. The melt flow index, the impact strength and the xylene-soluble contents are given in the table which follows.

100 parts by weight of this grafted propylene copolymer were reacted as described in Examples 16a and 15b with 0.28 part by weight of sodium acetate or 0.38 part by weight of zinc acetate.

The resultant sodium or zinc ionomers are colorless and odorless. As shown in Table 4 below, the ionomers have lower melt flow indices than the grafted propylene copolymer and, in particular, the zinc ionomer has a reduced xylene-soluble content.

EXAMPLES 17, 17a and 17b 100 parts by weight of a random propylene-ethylene copolymer having an ethylene content of 3.4% by weight [determined by Fourier transformation infra-red spectroscopy] and a melt flow index of 2 g/10 min were grafted under the conditions of Example 10 with 0.12 part by weight of liquid maleic anhydride. The product obtained is colorless and odorless. The melt flow index, the impact strength and the xylene-soluble contents are given in Table 4 which follows.

100 parts by weight of the resultant grafted random propylene-ethylene copolymer were reacted as described in Examples 15a and 15b with 0.2 part by weight of sodium acetate or 0.27 part by weight of zinc acetate.

The resultant sodium or zinc ionomers are colorless and odorless. As shown in Table 4 below, the zinc ionomer has a lower melt flow index than the grafted random propylene copolymer and a lower xylene-soluble content.

TABLE 3

|  | Examples | | | | | Comparative Examples | |
| --- | --- | --- | --- | --- | --- | --- | --- |
|  | 10 | 11 | 12 | 13 | 14 | C | D |
| Grafted comonomer content (parts by weight per 100 parts by weight of propylene copolymer) | 0.077 | 0.20 | 0.13 | 0.20 | 0.20 | 0.085 | 0.24 |
| Grafting yield (%) | 64 | 87 | 72 | — | | 71 | 89 |
| Melt flow index* (230° C./2.16 kg) | 3.8 | 8.2 | 10.7 | 2.0 | 7.1 | 10.4 | 1.0[a] (190° C./ 21.6 kg) |
| Xylene solubles** (%) | 3.2 | 17.0 | 8.3 | 10.1 | 11.2 | 4.9 | — |
| Adhesion*** to polyamide (N/15 mm) | 9 | 25 | 17 | — | — | 5 | — |

*in accordance with DIN 53 735
**at 23° C.
***in accordance with EP-A 157 107, pages 4–5
[a]in accordance with DIN 53 735

TABLE 4

| Example | | Melt flow index* | Torsion modulus** | Xylene-soluble content*** |
| --- | --- | --- | --- | --- |
| No. | Counterion | [230° C./2.16 kg] | [N/mm$^2$] | [%] |
| 15 | — | 10.2 | 475 | 16.0 |
| 15a | Sodium | 9.3 | 470 | 15.9 |
| 15b | Zinc | 8.0 | 470 | 10.9 |
| 16 | — | 4.6 | 225 | 37.4 |
| 16a | Sodium | 3.0 | 230 | 36.9 |
| 16b | Zinc | 1.7 | 200 | 26.4 |
| 17 | — | 11.3 | 395 | 9.2 |
| 17a | Sodium | 12.5 | 390 | 9.2 |
| 17b | Zinc | 8.8 | 385 | 8.6 |

*in accordance with DIN 53 735
**in accordance with DIN 53 445
***at 23° C.

We claim:

1. A process for the preparation of a propylene copolymer grafted with an α,β-ethylenically unsaturated carboxylic acid or derivative thereof,
wherein the propylene copolymer is (i) a copolymer containing from 40 to 95% of a propylene homopolymer and from 5 to 60% by weight of a random propylene copolymer containing as a comonomer at least one $C_2$ or $C_4$ to $C_{10}$-alk-1-ene and wherein said comonomer proportion is not more than 35% by weight based on the total polymer, or (ii) a random polypropylene copolymer containing up to 20% by weight of at least one $C_2$ or $C_4$ to $C_{10}$-alk-1-ene comonomer, by reacting the monomer to be grafted with a propylene copolymer at from 1 to 500 bar, which comprises, in the absence of a free-radical initiator, adding from 0.01 to 1.0% by weight, based on the propylene copolymer, of the monomer to be grafted to the molten propylene copolymer, and carrying out the graft reaction at from 210° to 350° C.

2. The method of claim 1 wherein the propylene copolymer is polymer (i).

3. The method of claim 1 wherein the propylene copolymer is polymer (ii).

* * * * *

UNITED STATES PATENT AND TRADEMARK OFFICE
CERTIFICATE OF CORRECTION

PATENT NO. : 5,476,905
DATED : December 19, 1995
INVENTOR(S) : SCHWAGER et al.

It is certified that error appears in the above-indentified patent and that said Letters Patent is hereby corrected as shown below:

On the cover page, item [54], and Column 1, the title should read as follows:

--GRAFTED, CROSSLINKED AND
CROSSLINKABLE PROPYLENE COPOLYMERS--.

Signed and Sealed this

Fifth Day of March, 1996

*Attest:*

BRUCE LEHMAN

*Attesting Officer*   *Commissioner of Patents and Trademarks*